(12) United States Patent
Tanaka et al.

(10) Patent No.: US 6,703,103 B2
(45) Date of Patent: Mar. 9, 2004

(54) BIOLOGICALLY SOLUBLE HONEYCOMB STRUCTURE

(75) Inventors: Minoru Tanaka, Yokohama (JP); Haruko Sasaki, Yokohama (JP)

(73) Assignee: Nichias Co., Ltd., Tokyo (JP)

( * ) Notice: Subject to any disclaimer, the term of this patent is extended or adjusted under 35 U.S.C. 154(b) by 0 days.

(21) Appl. No.: 10/254,914

(22) Filed: Sep. 26, 2002

(65) Prior Publication Data

US 2003/0072914 A1 Apr. 17, 2003

(30) Foreign Application Priority Data

Sep. 28, 2001 (JP) ........................................ 2001-301591

(51) Int. Cl.⁷ ................................................ B32B 3/12
(52) U.S. Cl. ........................ 428/116; 428/73; 501/35; 501/36; 501/38; 501/55; 501/72; 502/240; 502/407; 422/164; 422/168; 422/177; 422/180; 422/222; 422/240
(58) Field of Search ................................. 428/116, 117, 428/118, 73; 501/35, 36, 38, 53, 55, 72; 502/407, 232, 240; 422/164, 168, 177, 180, 211, 222, 240

(56) References Cited

U.S. PATENT DOCUMENTS

| 5,505,769 | A | * | 4/1996 | Dinnage et al. |
| 6,458,436 | B1 | * | 10/2002 | Hansen et al. |
| 2001/0029843 | A1 | * | 10/2001 | Minoru et al. |

FOREIGN PATENT DOCUMENTS

WO     WO 96/14274     5/1996

\* cited by examiner

Primary Examiner—Deborah Jones
Assistant Examiner—Wendy Boss
(74) Attorney, Agent, or Firm—Oblon, Spivak, McClelland, Maier & Neustadt, P.C.

(57) ABSTRACT

The honeycomb structure of the present invention is formed from a nonwoven fabric in which a biologically soluble fiber is used, and exhibits superior biological solubility and high heat resistance.

14 Claims, No Drawings

BIOLOGICALLY SOLUBLE HONEYCOMB STRUCTURE

BACKGROUND OF THE INVENTION

1. Field of the Invention

The present invention relates to a biologically soluble honeycomb structure with high heat resistance used in NOx removal catalysts and the like.

2. Description of Background Art

Honeycomb structures have been widely used as catalyst carriers and the like. Conventionally, ceramic papers and the like made from ceramic fibers such as alumina-silica by paper-milling have been used as materials for honeycomb structures. In recent years, however, honeycomb structures in which ceramic fibers are not used have been demanded in Europe due to suspected carcinogenic properties of ceramic fibers. As honeycomb structures in which materials other than ceramic fibers are used, a honeycomb structure using glass fibers such as E-glass is known.

However, E-glass fibers have low heat resistance of about 500° C. at most. For this reason, honeycomb carriers made from E-glass fibers cannot be used as a carrier for NOx removal catalysts which may be used at high temperatures of above 500° C.

An object of the present invention is, therefore, to provide a honeycomb carrier with superior biological solubility and high heat resistance.

SUMMARY OF THE INVENTION

In view of this situation, the inventor of the present invention has conducted extensive studies and, as a result, has found that a honeycomb carrier with superior biological solubility and high heat resistance can be obtained by forming a honeycomb structure using biologically soluble fiber. This finding has led to the completion of the present invention.

Specifically, the present invention provides a honeycomb structure made from a nonwoven fabric containing biologically soluble fiber.

DETAILED DESCRIPTION OF THE PREFERRED EMBODIMENT

The honeycomb structure of the present invention is formed from a nonwoven fabric in which a biologically soluble fiber is used. A non-woven fabric obtained by paper-milling a biologically soluble fiber and adding a binder and the like can be given in the present invention.

The biologically soluble fiber in the present invention is defined as a fiber exhibiting a fiber solubility (the amount of fiber dissolved) of 3.5% or more, preferably 5.0% or more, when 1.0 g of such a biologically soluble fiber passing through a 200 mesh sieve is mixed with 150 ml of a physiological saline solution at 40° C. and the mixture is shaken by horizontal shaking in a 300 ml conical flask with a turncock at a rate of 120 times/minute for 50 hours. The physiological saline solution used here is a solution prepared by dissolving 6.780 g of sodium chloride, 0.535 g of ammonium chloride, 0.268 g of sodium hydrogencarbonate, 0.166 g of sodium dihydrogencitrate, 0.059 g of sodium citrate dihydrate, 0.450 g of glycine, 0.022 g of calcium chloride, and 0.049 g of sulfuric acid in 1 l of water, and has a pH of 7.4. If the fiber solubility is 3.5% or more after 50 hours, the biologically soluble fiber inhaled by humans is dissolved in the body and loses the shape of fiber. Therefore, there is no possibility that biologically soluble fiber has a harmful influence on the human body.

The following three types of biologically soluble fibers can be given as examples of the fibers exhibiting the above biologically soluble properties. The first type of biologically soluble fiber comprises usually, 60 to 72 wt % of $SiO_2$, 15 to 27 wt % of CaO, 12 to 19 wt % of MgO, and 0 to 13 wt % of $TiO_2$, preferably 63 to 69 wt % of $SiO_2$, 15 to 20 wt % of CaO, 12 to 16 wt % of MgO, and 0.5 to 5 wt % of $TiO_2$.

The second type of biologically soluble fiber comprises $SiO_2$, MgO, and $TiO_2$ as essential components, which form an amorphous substance in the structure. This second type of biologically soluble fiber preferably comprises 60 to 80 wt % of $SiO_2$, 15 to 28 wt % of MgO, and 4 to 20 wt % of $TiO_2$. The second type of biologically soluble fiber may further comprise 0 to 10 wt % of MgO and 0 to 10 wt % of $ZrO_2$.

The third type of biologically soluble fiber comprises $SiO_2$, MgO, and manganese oxides as essential components. Any compound containing oxides of manganese in any form such as MnO and $MnO_2$, for example, may be used as the manganese oxides. Given as the examples of third type of biologically soluble fiber are fibers comprising preferably 60 to 80 wt % of $SiO_2$, 15 to 30 wt % of MgO, and 0.5 to 20 wt % (as MnO) of manganese oxides, more preferably 65 to 80 wt % of $SiO_2$, 15 to 28 wt % of MgO, and 0.2 to 20 wt % (as MnO) of manganese oxides, still more preferably 65 to 80 wt % of $SiO_2$, 15 to 28 wt % of MgO, and 0.4 to 20 wt % (as MnO) of manganese oxides, and particularly preferably 70 to 80 wt % of $SiO_2$, 15 to 28 wt % of MgO, and 0.4 to 20 wt % (as MnO) of manganese oxides. The first to third type of biologically soluble fibers may contain other components inasmuch as the composition of $SiO_2$ and the like is in the above range.

Part of the $SiO_2$, MgO, and the like in the above biologically soluble fibers is dissolved in a physiological saline solution. When CaO is included, part of the CaO is dissolved. The biologically soluble fiber with the above composition not only excels in biological solubility, but also exhibits high heat resistance of at 1,000° C. or more.

The biologically soluble fiber used in the present invention has usually an average fiber diameter of 1 to 20 µm, preferably 1 to 4 µm. The average fiber diameter in the above range is preferable because nonwoven fabrics made from the biologically soluble fiber by paper milling have large voids.

The nonwoven fabrics used in the present invention can be obtained by paper-milling of the above biologically soluble fiber and adding a binder. As examples of binders used in the present invention, organic binders such as polyvinyl alcohol and acrylic binder, and inorganic binders such as colloidal silica, and the like can be given. These binders may be used either individually or in combination of two or more.

The nonwoven fabrics may further comprise organic fibers, if necessary. As examples of the organic fibers, pulp, rayon fiber, vinylon fiber, acrylic fiber, and PET fiber can be given. Inclusion of organic fibers in the nonwoven fabrics does not only improve corrugating processability, but also increases the void ratio of the nonwoven fabrics because organic fibers burn and are eliminated by calcination.

When the biologically soluble fibers and binders are made into paper, usually 0.5 to 5 parts by weight, preferably 1 to 3 parts by weight of the binders are used for 100 parts by weight of the biologically soluble fibers. When organic fibers are optionally used, the amount is usually in the range of 5 to 40 parts by weight, preferably 10 to 35 parts by weight, for 100 parts by weight of the biologically soluble fibers. This range of organic fibers is preferable because the resulting nonwoven fabrics have a proper range of void ratio. As the paper-milling method, a conventional method using a round net paper-milling machine and the like can be given, without any specific limitation.

The biologically soluble fibers and binders are dispersed in water during the paper-milling process. The concentration of the biologically soluble fibers in the slurry is usually 0.3 to 2 wt %, preferably 0.5 to 1.5 wt %. The slurry concentration of the above range ensures good dispersion, which results in papers with homogeneous composition and thickness.

The nonwoven fabrics have an inter-fiber void ratio usually of 60 to 95%, preferably of 70 to 90%. If the inter-fiber void ratio is less than 60%, it is difficult to cause the catalyst to be carried by the honeycomb structure. If the inter-fiber void ratio exceeds 95%, the strength of the resulting nonwoven fabrics is insufficient and the amount of catalyst carried by the honeycomb structure easily decreases.

The nonwoven fabrics have usually a thickness of 0.05 to 2.0 mm. If the thickness is less than 0.05 mm or more than 2.0 mm, corrugating the nonwoven fabrics becomes difficult.

The honeycomb structure of the present invention is formed from a plate form nonwoven fabric made from biologically soluble fibers and a waveform nonwoven fabric by alternately laminating and causing the plate form fabric and the waveform fabric to adhere. To form a waveform nonwoven fabric, a flat nonwoven fabric, for example, may be processed using a commonly used corrugating machine.

As the method of causing the alternately laminated flat nonwoven fabrics and waveform nonwoven fabrics to adhere, a method of applying an adhesive to the hills of waveform nonwoven fabric and causing the waveform nonwoven fabric to adhere to the flat nonwoven fabric can be given, for example. As an adhesive, the adhesive containing an organic binder and, if required, an inorganic binder and inorganic filler can be given.

In the honeycomb structure of the present invention, the interval between two juxtaposing hills, in other words, the honeycomb pitch, is usually in the range of 1.0 to 20 mm. The height of the honeycomb cell in the honeycomb structure of the present invention is usually in the range of 0.5 to 10 mm.

The honeycomb structure of the present invention has a high heat resistance and is free from deformation by heat when used at high temperatures. Specifically, the volume shrinkage rate when heated for 3 hours at 800° C. is usually less than 10%, preferably less than 6%.

The honeycomb structure of the present invention can be used as a carrier for catalysts and adsorbents. The honeycomb structure of the present invention can be preferably used as a NOx removal carrier for catalysts utilizing the high heat resistance of 800° C. or more. As specific examples of NOx removal catalysts, $WO_3$—$V_2O_5$—$TiO_2$, $V_2O_5$—$TiO_2$, $WO_3$—$TiO_2$, and the like can be given.

EXAMPLES

The present invention will be described in more detail by examples, which should not be construed as limiting the present invention.

Example 1

90 parts by weight of SUPERWOOL 607 MAX (manufactured by THERMAL CERAMICS Co., Ltd., composition, $SiO_2$: 67 wt %, CaO: 19 wt %, MgO: 13 wt %, average fiber diameter: 3.5 μm) as a biologically soluble fiber, 10 parts by weight of pulp as an organic fiber, and 2 parts by weight of polyvinyl alcohol as a binder were diluted with water to make a slurry with the total content of the biologically soluble fiber and the pulp dispersed therein of 1 wt %. The slurry was milled using a round net paper-milling machine according to a conventional method to produce flat nonwoven fabrics with an inter-fiber void ratio of 90% and a thickness of 0.3 mm.

The flat nonwoven fabrics were divided into those to be corrugated and those not to be corrugated. The nonwoven fabrics to be corrugated were passed through a pair of upper and lower corrugated rolls to produce corrugated nonwoven fabrics.

Glue prepared by blending 90 parts by weight of colloidal silica with 10 parts by weight of Aerogyl was applied to the hilltops of the corrugated nonwoven fabric. The non-corrugated flat nonwoven fabric was placed on the hills of the corrugated nonwoven fabric and the both were caused to adhere to each other, thereby obtaining an integrated material consisting of two nonwoven fabrics. The integrated material was cut in the direction perpendicular to the direction of the wave to obtain a sheet with a length of 500 mm in the wave direction. Then, the glue was applied to the hilltops of the integrated material to continue the lamination until the height became 250 mm. The resulting integrated material was dried to obtain a block. The block was cut to make the length of the cell depth direction 1,000 mm, thereby obtaining a honeycomb structure with an external dimension of 500 mm×250 mm×1,000 mm. The cell pitch and cell height of the honeycomb structure were 8.4 mm and 5.0 mm, respectively.

The volume shrinkage rate of the honeycomb structure after heating for three hours at 800° C. was 4%. The volume shrinkage rate herein indicates the ratio of volume shrinkage before and after heating.

The biological solubility of the biologically soluble fibers prepared using the resulting honeycomb structure was measured to find that the solubility was 6.0%. The biological solubility was measured according to the following method.

(Method of Measuring Biological Solubility)

The resulting biologically soluble fiber was crushed to a size passing through a 200-mesh sieve. 1.0 g of the biologically soluble fiber and 150 ml of a physiological saline solution with the composition shown in Table 1 were charged into a 300 ml conical flask with a turncock, which was horizontally shaken at a rate of 120 times/minute for 50 hours, while maintaining the temperature at 40° C. After horizontal shaking, the slurry in the conical flask was filtered and the filtrate was subjected to elemental analysis by ICP emission spectrophotometry. The solubility was determined from the analytical results and the composition and weight of the sample.

TABLE 1

| Compound | Amount |
| --- | --- |
| Water | 1 l |
| Sodium chloride | 6.780 g |
| Ammonium chloride | 0.535 g |
| Sodium hydrogencarbonate | 0.268 g |
| Sodium dihydrogencitrate | 0.166 g |
| Sodium citrate dihydrate | 0.059 g |
| Glycine | 0.450 g |
| Calcium chloride | 0.022 g |

TABLE 1-continued

| Compound | Amount |
| --- | --- |
| Sulfuric acid | 0.049 q |
| pH of the solution | 7.4 |

Example 2

A honeycomb structure was prepared in the same manner as in Example 1 except for using, instead of the SUPER-WOOL 607 MAX, a fiber containing 72.2 wt % of $SiO_2$, 19.9 wt % of MgO, 6.3 wt % of $TiO_2$, 1.1 wt % of $Al_2O_3$, 0.3 wt % of CaO, and 0.2 wt % of other components, as well as an amorphous substance containing these components in the structure.

The volume shrinkage rate and biological solubility of the honeycomb structure were measured in the same manner as in Example 1. The volume shrinkage rate was 3.0% and the biological solubility was 6.0%.

Example 3

A honeycomb structure was prepared in the same manner as in Example 1 except for using, instead of the SUPER-WOOL 607 MAX, a fiber containing 73.9 wt % of $SiO_2$, 20.8 wt % of MgO, 4.5% of $MnO_2$, 0.6 wt % of $Al_2O_3$, 0.2 wt % of CaO, and 0.2 wt % of other components.

The volume shrinkage rate and biological solubility of the honeycomb structure were measured in the same manner as in Example 1. The volume shrinkage rate was 3.5% and the biological solubility was 6.0%.

Comparative Example 1

A honeycomb structure was prepared in the same manner as in Example 1, except for using glass fiber ECS 10-765 (manufactured by Central Glass Co., Ltd. E-glass fiber, average fiber diameter: 3.0 μm) instead of the biologically soluble fiber.

The volume shrinkage rate and biological solubility of the honeycomb structure were measured in the same manner as in Example 1. The volume shrinkage rate was 50% and the biological solubility was 0.1%.

INDUSTRIAL APPLICABILITY

The biologically soluble honeycomb structure of the present invention has high heat resistance and excels in biological solubility. Due to the high heat resistance, the honeycomb structure can be used as a carrier for catalysts used at temperatures of 800° C. or more such as a NOx removal catalyst.

What is claimed is:

1. A honeycomb structure made from a nonwoven fabric containing biologically soluble fiber, wherein the volume shrinkage rate when heated for 3 hours at 800° C. is less than 10%.

2. The honeycomb structure according to claim 1, formed by alternately laminating a flat nonwoven fabric and a waveform nonwoven fabric.

3. The honeycomb structure according to claim 1 or claim 2, wherein the nonwoven fabric is prepared by paper-milling said biologically soluble fiber and a binder.

4. The honeycomb structure according to claim 1 or claim 2, wherein the biologically soluble fiber comprises 60 to 80 wt % of $SiO_2$, 15 to 28 wt % of MgO, and 4 to 20 wt % of $TiO_2$, and an amorphous substance containing these components in the structure.

5. The honeycomb structure according to claim 1 or claim 2, wherein the biologically soluble fiber comprises 60 to 80 wt % of $SiO_2$, 15 to 30 wt % of MgO, and 0.5 to 20 wt % (as MnO) of manganese oxides.

6. The honeycomb structure according to claim 1 or claim 2, used as a carrier for a catalyst or adsorbent.

7. The honeycomb structure according to claim 1, wherein said volume shrinkage rate is less than 6%.

8. The honeycomb structure according to claim 1, wherein said volume shrinkage rate is less than 4%.

9. The honeycomb structure according to claim 1, wherein said volume shrinkage rate is less than 4%.

10. A honeycomb structure made from a nonwoven fabric containing biologically soluble fiber and an NOx removal catalyst.

11. The honeycomb structure of claim 10, wherein said NOx catalyst is selected from the group consisting of $WO_3$—$V_2O_5$—$TiO_2$, $V_2O_5$—$TiO_2$, and $WO_3$—$TiO_2$.

12. structure according to claim 10, wherein said volume shrinkage rate is less than 6%.

13. The honeycomb structure according to claim 10, wherein said volume shrinkage rate is less than 4%.

14. The honeycomb structure according to claim 10, wherein said volume shrinkage rate is less than 3%.

* * * * *